(12) United States Patent
Exely et al.

(10) Patent No.: US 7,036,639 B2
(45) Date of Patent: May 2, 2006

(54) ELECTRONICALLY PROGRAMMABLE ACTIVELY DAMPED SENSOR MOUNT

(75) Inventors: Bruce Exely, St. Louis, MO (US); Thomas Linton, Lake St. Louis, MO (US); Robert Talir, Florissant, MO (US)

(73) Assignee: DRS Systems and Electronics, St. Louis, MO (US)

( * ) Notice: Subject to any disclaimer, the term of this patent is extended or adjusted under 35 U.S.C. 154(b) by 0 days.

(21) Appl. No.: 10/868,684

(22) Filed: Jun. 15, 2004

(65) Prior Publication Data

US 2005/0056111 A1    Mar. 17, 2005

Related U.S. Application Data

(60) Provisional application No. 60/499,203, filed on Aug. 29, 2003.

(51) Int. Cl.
*B60T 7/12* (2006.01)

(52) U.S. Cl. ............... 188/137; 188/180 T; 188/181 A; 89/41.02

(58) Field of Classification Search ............... 89/41.02; 188/378, 137, 162, 180, 181 A, 181 T
See application file for complete search history.

(56) References Cited

U.S. PATENT DOCUMENTS

| | | | |
|---|---|---|---|
| 3,885,453 A | 5/1975 | Higginson et al. | |
| 4,199,989 A | 4/1980 | Forward et al. | |
| 4,226,303 A | 10/1980 | Thoma | |
| 4,621,785 A | 11/1986 | Embra | |
| 4,643,074 A | 2/1987 | Gunda et al. | |
| 4,752,791 A * | 6/1988 | Allred ..................... | 396/13 |
| 5,020,890 A * | 6/1991 | Oshima et al. ............ | 359/554 |
| 5,059,019 A | 10/1991 | McCullough | |
| 5,281,988 A | 1/1994 | Martin | |
| 5,285,397 A | 2/1994 | Heier et al. | |
| 5,432,423 A | 7/1995 | York | |
| 5,742,278 A * | 4/1998 | Chen et al. ............... | 345/156 |
| H1850 H | 6/2000 | Zimmermann | |
| 6,104,382 A | 8/2000 | Martin et al. | |
| 6,219,033 B1 | 4/2001 | Rosenberg et al. | |
| 6,262,712 B1 | 7/2001 | Osborne et al. | |
| 6,429,849 B1 | 8/2002 | An et al. | |
| 2002/0033841 A1 | 3/2002 | Rosenberg | |
| 2002/0063685 A1 | 5/2002 | Rosenberg et al. | |
| 2002/0080116 A1 | 6/2002 | Onodera et al. | |

FOREIGN PATENT DOCUMENTS

DE    10105512    10/2001

(Continued)

*Primary Examiner*—Devon C. Kramer
(74) *Attorney, Agent, or Firm*—Lewis, Rice & Fingersh, L.C.

(57) ABSTRACT

An active damping system for damping the rotation of an object to an extent dependent upon the angular velocity of the object utilizes a feedback mechanism and provides a robust method for rotational damping. The active damping system comprises a torque controller, a speed measuring device connected to said torque controller for measuring a speed correlated with the rotation to be damped, and a torque generating device for producing the damping torque, which is controlled by the torque controller. Where the torque controller is a microprocessor, various defined relationships between the rotation to be damped and the damping torque can be programmed into the torque controller, which can also perform diagnostics on the active damping system. Both the programmability and the ability to perform diagnostics allow the active damping system to respond reproducibly over a range of environmental conditions.

6 Claims, 7 Drawing Sheets

FOREIGN PATENT DOCUMENTS

| | | |
|---|---|---|
| GB | 2029646 | 3/1980 |
| JP | 3053770 | 3/1991 |
| JP | 4038507 | 2/1992 |
| JP | 5026599 | 2/1993 |

\* cited by examiner

ELECTRONICALLY PROGRAMMABLE ACTIVELY DAMPED SENSOR MOUNT

CROSS REFERENCE TO RELATED APPLICATIONS

This application claims the benefit of U.S. Provisional Application No. 60/499,203, filed Aug. 29, 2003, the entire disclosure of which is herein incorporated by reference.

STATEMENT REGARDING FEDERALLY SPONSORED RESEARCH OR DEVELOPMENT

Not Applicable.

BACKGROUND OF THE INVENTION

1. Field of Invention

The invention generally relates to systems and methods for mounting various devices, which mounting systems and methods provide at least one axis of rotation about which rotational motion is damped. More particularly, the invention relates to mounts that provide active electronically controlled damping via electric motors.

2. Description of Related Art

In military strategy, there is a great desire to be able to view the enemy so as to allow an offensive military force to bring weapons to bear on the enemy while maintaining certain protections for the offensive force. Some protection can be provided by maintaining distance from the enemy. One method used to bring fire down upon an enemy from a distance is the artillery barrage. Artillery weapons are generally designed to have an extremely long range and are capable of firing at targets to which there is no direct line of sight from the weapon (e.g., due to intervening terrain) by firing their ordnance in high arcs. This capability provides another level of protection in that these weapons can be usefully located in positions where they are hidden, such as by the terrain. Artillery batteries are often safe from fire from the enemy, as the enemy cannot locate them to direct retaliatory fire. Even if the enemy knows their location, the enemy may not have access to weapons with sufficient range to reach them.

The problem with firing artillery, however, is that the ordnance fired must somehow be aimed so that it is accurately delivered onto enemy positions, instead of being fired randomly or, worse, fired upon friendly positions which may be nearby. Since the artillery batteries generally cannot sight the enemy directly, they often rely on forward observers to locate targets, and to provide updates on these positions so the artillery battery can track the targets and adjust their aim appropriately.

Traditionally, forward observers were infantrymen who moved to positions within sight of the enemy. Using a remote communications method such as radio, forward observers instructed the artillery gunners where to fire in order to hit targets relative to the forward observer's own location. As visual enhancement technologies became more sophisticated, machines began to be used to enhance human visual capabilities, including range of sight. These machines range from a simple pair of binoculars to advanced night vision and RADAR systems. As the technology has advanced, the bulk and weight of these machines has increased. Therefore, in much of artillery sighting today, a vehicle is used to carry a sensor suite of various vision enhancing machines. The vehicle also carries a crew of a few individuals who, by using the sensor suite and other onboard technology, locate enemy targets and return those locations to the artillery batteries. Generally, in the U.S. Army these personnel are members of the Combat Observation Lasing Team (COLT), the mission of COLT being to act as the mobile forward observer for the artillery. While a targeting sensor suite may be mounted on numerous vehicles, for simplification (but not be way of limitation of any disclosure herein) the vehicle on which a sensor suite as above discussed is mounted will be referred to as a COLT vehicle.

On board the COLT vehicle is a sensor suite for use in targeting that often comprises an infrared camera for night operations, day view optical telescope, a laser rangefinder, a laser target designator for laser guided weapons, and an Inertial Navigation System (INS), or other similar devices. This sensor suite is usually attached to a ring mount on the roof of the vehicle carrying the sensor suite, which ring mount can rotate through 360°. On the COLT vehicle, along with the sensor suite, there is also generally a Mission Processor Unit (MPU) and a communications computer, which are used to link into the tactical radio network allowing targeting information from the sensor suite of the COLT to be transmitted to units or weapons in the artillery battery for use in aiming long range weapons. The sensors in the sensor suite are accurately aligned to one another and to the INS so that the errors are usually extremely small and targeting accuracy is high when targets are acquired and accurately tracked by the sensor suite.

In order to allow the sensor suite to target the enemy, particularly when the enemy is on the move, the sensor suite will generally be supported on a mount which is often a gimbal-type mount called a Traversing Unit ("TU"), which is in turn mounted to the ring mount on the roof of the vehicle. The TU allows the sensor suite to be moved in azimuthal and attitudinal (also referred to herein as elevational) angles, providing the sensor suite with the capability to track targets moving in any direction.

The sensors typically have high magnification to allow observing and targeting at great distances (generally miles). This high magnification can make the tasks of acquiring and accurately tracking targets difficult when manually performed. As opposed to computer controlled systems where remote control can utilize small motors and gearing to execute very small directional changes, in a human-powered (manually controlled) system, which are preferred in some circumstances, particularly due to issues of weight, cost, and simplicity of manufacture and operation, the application of force by human muscles is used to direct movement of the TU. The human body, however, is fairly imprecise when it comes to small movements. Human musculature is designed for fairly large movements. Because of the sensitivity of the sensor suite and the accuracy required to effectively target the artillery batteries, the TU needs to be designed to reduce vibration and other unintended motions caused by the imperfections of the human user. As is well known, due to the great distance over which targeting occurs, a small rotation of the sensor suite by only tens of microradians can lead to deviations of many meters in the calculated location of the target.

For these reasons, rotation of the TU in both the azimuth and elevation axes is preferably damped to provide a resistive torque to make sensor movement controlled and smooth. By providing a damping torque, the effects of small unintended torque inputs by the user are minimized. Damping provides the system with a "feel" translated to the user to assist their motion in being smooth and provide for a more uniform movement allowing the human user to rotate the sensor suite more accurately, and at lower rates. The TU also preferably includes a "slip clutch" effect to limit the damping effect at high rotational speed so that the sensor suite can be spun around to acquire targets in a different sector quickly and without having to fight increased resistance. Further, the amount of resistance preferably increases the faster the device is being moved.

Currently, TU systems utilize fluid resistance to create the damping effect. One such fluid damping system is described in U.S. Pat. No. 3,885,453, the entire disclosure of which is herein incorporated by reference, for the targeting of a missile launcher. Fluid damping systems also generally include a slip clutch to allow for high speed movement for additional target acquisition. The TU damping and clutch system is tuned with fluid orifices and springs to get a system balanced for the weight and inertia of the sensor suite, the capabilities of the operator, and the capabilities of the sensors. This tuning tries to match the system to the mission, and soldiers are trained to use the system and the profile of the system to target accurately.

FIG. 1 provides for an embodiment of the resistance profile (also termed a damping function or a damping torque curve) of fluid damped systems under testing conditions and for manually acquiring a target and for tracking moving targets at distances between 1000 and 5000 meters. The fluid damped systems also include a slip clutch allowing the sensor to be rotated at speeds above 3°/sec without increased resistance above that provided at 3°/sec, which allows the operator to specifically re-acquire targets in other sectors. As can be seen in FIG. 1, there are significant changes in the resistance profile depending on the rate of rotation and the ambient temperature. For instance, the line 101 represents a target resistance profile for which the resistive torque increases exponentially as the slew rate of the sensor suite increases up to a designated slew rate. At a fixed point 103, the slew rate is determined to be a rapid traverse move, and the slip clutch is activated, fixing the resistive torque at a level value (as shown by the leveling of line 101). The wide block (cross-hatched) line 105, showing variance on either side of line 101, represents the tolerance of fluid damped systems at a fixed temperature (77° F.). The variation about the target line 101 is a result of the variation in the behavior of the fluid damping assemblies due to such factors as the exact viscosity of the fluid used, calibration of components, and accuracy in machining and machine tolerances. Small variations in design can result in relatively dramatic changes.

Also visible in FIG. 1 are two curves 107 and 109 that show variations for high temperature, 145° F. (curve 107), and low temperature, −25° F. (curve 109), for a single fluid damping assembly. These expanded limits exist because of the wide variation in the fluid viscosity as a function of temperature. Colder fluids generally become more viscous, while hot fluids are generally less viscous. Therefore, even if the system has a known resistance curve at a first temperature, changes in the temperature can alter the curve as the temperature changes. The net result is that the TU damping characteristics vary as much as 15 ft-lb over the temperature range shown resulting in variable performance in the target acquisition and tracking tasks.

This difference in performance makes it difficult for the human user to accurately target in different conditions as the TU's "feel" (that is the amount of force they must generate to carry out a particular movement) will change depending on environment, and even across relatively identical units. Further, this change may necessitate constant recalibration and user practice with the TU to make sure that the human operator can use the unit effectively as they must constantly adjust to slight variations. For this reason, it is preferable that a TU provide consistent damping characteristics from unit to unit and across its operational temperature range. Clearly, as shown in FIG. 1, existing TUs utilizing fluid damping result in wide damping variations and fall woefully short of consistency, leading to difficulty in their use and inaccuracy.

SUMMARY OF THE INVENTION

In an embodiment of the invention, the rotational damping torque that was passively provided by the fluid damping elements in the prior art Traversing Unit ("TU") is instead provided by an active damping system. In an embodiment, active damping is provided through a feedback loop within which a damping torque is adjusted in real-time in order to correlate to an external input, such as the external rotational force applied to the TU. A preferred embodiment of the invention has electronically programmable active damping allowing for the relationship between the damping torque produced and the external input (e.g., rotational force) to vary depending on a third variable such as time or temperature. In an embodiment designed for military targeting applications, the active damping is programmed to provide an amount of damping that feels similar to the damping provided by the prior art fluid damped system typically used in such an application. Such an embodiment is preferred since soldiers who will be using the actively damped system are already trained to use the prior art fluid damped systems, so that by generally replicating the feel of the fluid damped systems the time required to learn to use the actively damped system may be decreased. Besides military targeting applications, embodiments of the present invention may be applicable in various applications where damping of rotational motion is appropriate, such as industrial automation generally, and rotationally mounted lighting, cameras, and other remote sensing equipment, including telescopes used, e.g., in astronomy.

In an embodiment, the active damping system is used for damping the rotation of an object to an extent dependent upon the angular velocity of the object. Such an embodiment of the active damping system includes a torque controller; a speed measuring device connected to the torque controller so as to allow speed measurement data created by the speed measuring device in connection with a speed measurement correlated to rotation of the object to be transferred to the torque controller, and a torque generating device connected to the torque controller so as to allow the torque controller to transmit damping torque data to the torque generating device to control a damping torque generated by the torque generating device, wherein the damping torque acts in a decelerating manner on the rotation of the object. In alternate embodiments, the damping torque may correspond to the speed measurement through a predetermined relationship, and the torque generating device may convey torque through a rotating drive shaft. In a preferred embodiment, the active damping system comprises a torque generating device that is an electric motor, a speed measuring device that is an encoder; and a torque controller that is a microprocessor.

In such a preferred embodiment, wherein the torque controller is a microprocessor, it is further preferred that the microprocessor controls the damping torque through computation of the damping torque data based on a defined relationship between the damping torque and the rotational rate of the object. Such a defined relationship may include a range of rotational rate values above a threshold value for which the damping torque is essentially constant; this is one method to emulate a similar relationship between a damping torque and a rotational rate as defined by the operation of a slip clutch acting within a mechanism for the delivery of a damping torque to a rotating object.

In yet another embodiment, the active damping system further comprises a gearbox having at least one gear that modifies the torque generated by the torque generating device, preferably the gearbox in such an embodiment includes at least one gear that is a harmonic gear.

In a further embodiment, the active damping system further comprises a resolver connected to the rotating object so as to enable the resolver to operate as a sensor of the rotational position of the object.

Another embodiment of the present invention is a method of damping rotational motion of an object, the steps of the method comprising providing an active damping system for damping the rotation of an object to an extent dependent upon the angular velocity of the object, creating data correlated to a rotational rate of the object using the speed measuring device, transmitting the data correlated to the rotational rate of the object to the torque controller, computing damping torque data correlated to a damping torque as defined by a predetermined relationship to the rotational rate of the object, the computation performed using the torque controller, sending the damping torque data from the torque controller to the torque generating device, and adjusting the damping torque generated by the torque generating device according to the damping torque data from the torque controller.

In an alternate embodiment of the method the step of sending comprises passing the damping torque data through an amplifier. In a further alternate embodiment of the method, the step of computing is performed based in part on variables other than the data correlated to the rotational rate, including, for example, ambient temperature and factors related to the alteration of the torque due to the active damping system including a gearbox having at least one gear through which the torque is conveyed.

Yet another embodiment of the present invention is an assembly for mounting an object that includes at least one support arm, at least one connector through which the object is rotationally attached to the support arm such that rotation of the object may occur about a first axis of rotation, and at least one active damping system for damping the rotation of an object to an extent dependent upon the angular velocity of the object, wherein the at least one active damping system includes a first active damping system capable of conveying a damping torque that acts to oppose rotation of the object about the first axis of rotation.

In an alternate embodiment, the assembly for mounting an object further comprises a base rotatably connected to the support arm such that rotation of the support arm relative to the base occurs about a second axis of rotation. A further alternate embodiment is an assembly for mounting an object as described above, wherein the at least one active damping system includes a second active damping system capable of conveying a damping torque that acts to oppose rotation of the object about the second axis of rotation. In another embodiment, the first and second axes of such an assembly for mounting an object are perpendicular.

In a yet further embodiment, an assembly for mounting an object further comprises at least one resolver connected to the object so as to enable the resolver to operate as a sensor of the rotational position of the object. In another embodiment the at least one resolver includes a first resolver capable of sensing the rotational position of the object relative to a first axis, and a second resolver capable of sensing the rotational position of the object relative to a second axis.

DETAILED DESCRIPTION OF THE PREFERRED EMBODIMENT(S)

Figure 3:
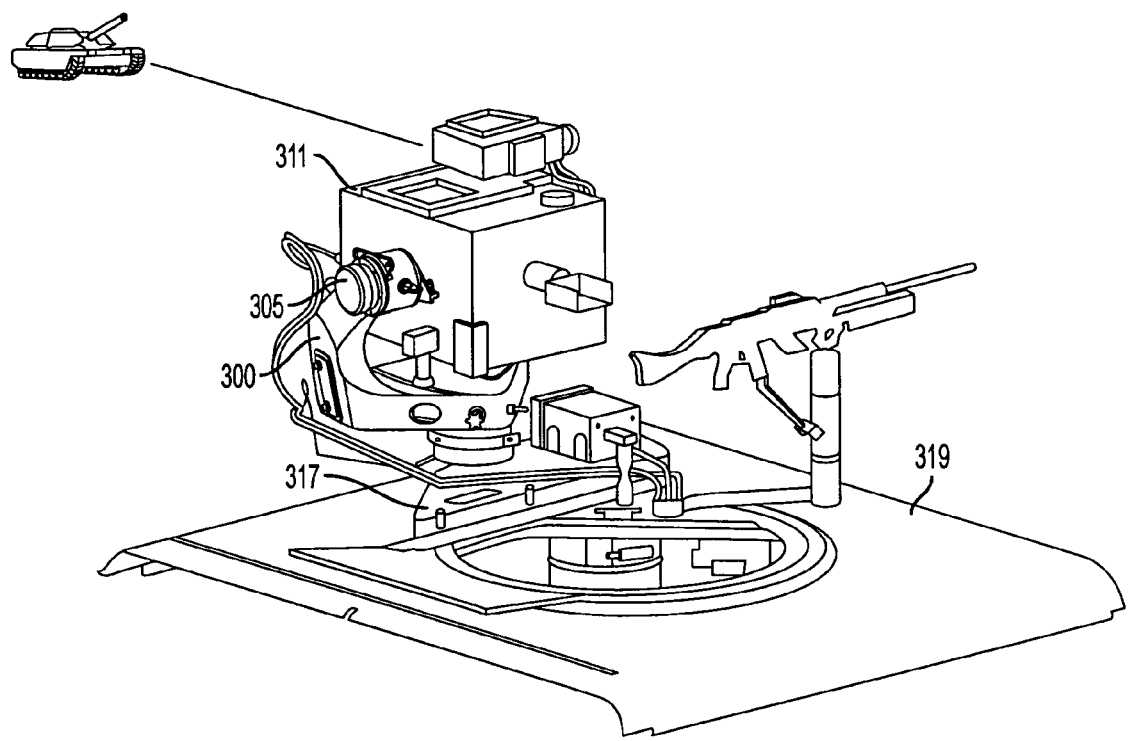
FIG. 3 shows a sensor mount assembly (SMA) including an embodiment of an electronically programmable active damping system, the SMA, itself, mounted on a vehicle and carrying an embodiment of a sensor suite.

FIGS. 3–6 provide detailed illustrations of a Traversing Unit ("TU") (or portions thereof) that includes an embodiment of an electronically controlled active damping system, the combination of the TU and the active damping system comprising an embodiment of the invention. The embodiment depicted that is a TU with active damping will be referred to herein as a Sensor Mount Assembly (SMA) 300, so denominated to refer to the fact that in this embodiment the TU is used to mount remote sensing equipment, such equipment herein termed a sensor suite 311 (refer to Background). FIG. 3 shows the SMA 300 having a sensor suite 311 mounted on it, the SMA 300, itself, being mounted on a greater assembly 317 for use in military applications, wherein the greater assembly 317 is used to connect the SMA to a vehicle, only the roof 319 of which is shown in FIG. 3. In the depicted embodiment, two sensors comprise the sensor suite 311, and are rigidly mounted in piggyback formation so as to have equivalent motions relative to portions of the SMA 300. The sensor suite 311, however, may comprise any single sensor or any array of sensors that are mounted on the SMA 300. The function of the SMA 300 is generally to support the sensor suite 311 and to provide two degrees of freedom through which the sensor suite 311 can be moved.

Figure 1:
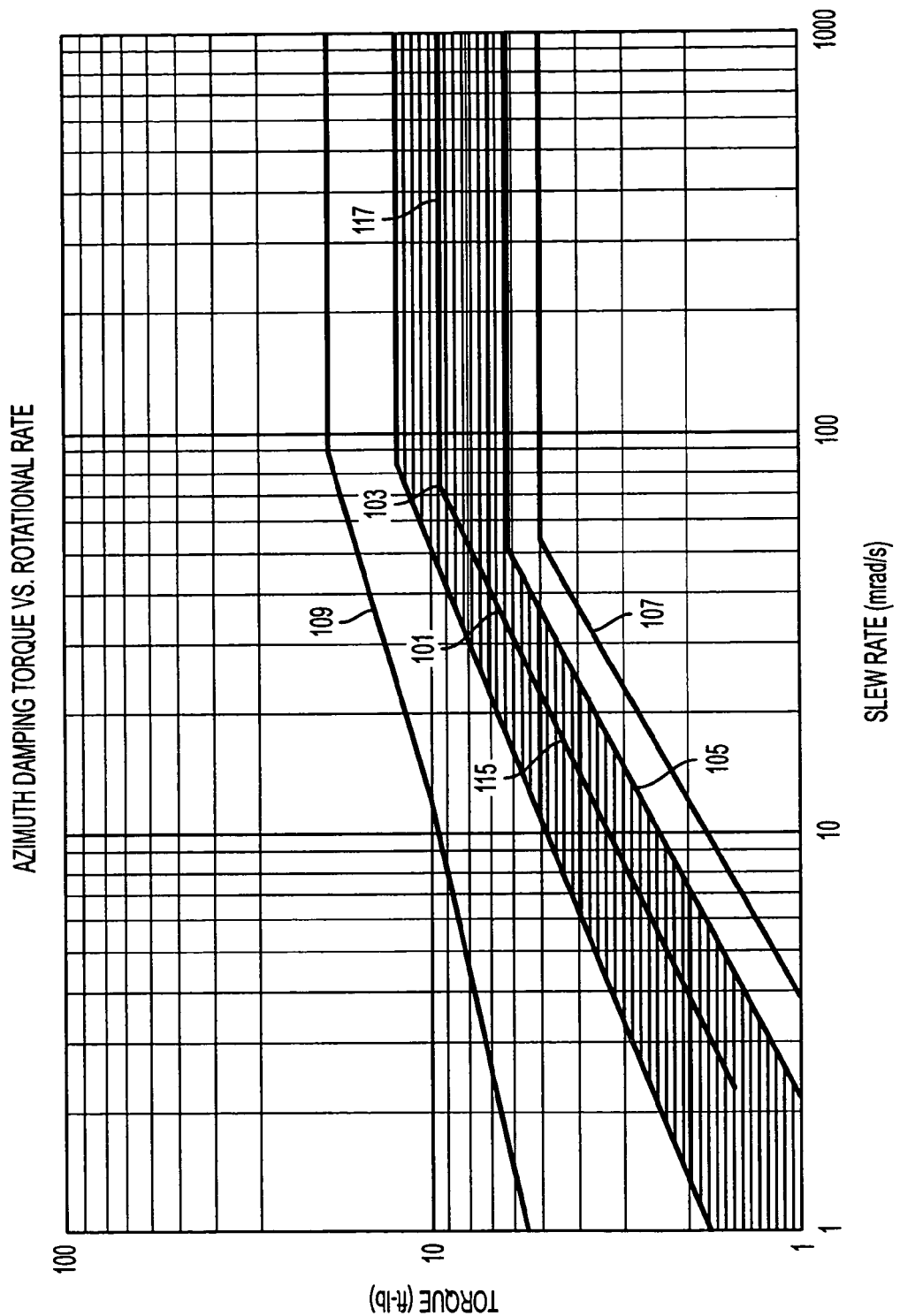
FIG. 1 provides a graph of the relationship between desired damping torque and slew rate as is common for fluid damped traversing units of the prior art.
Figure 4A:
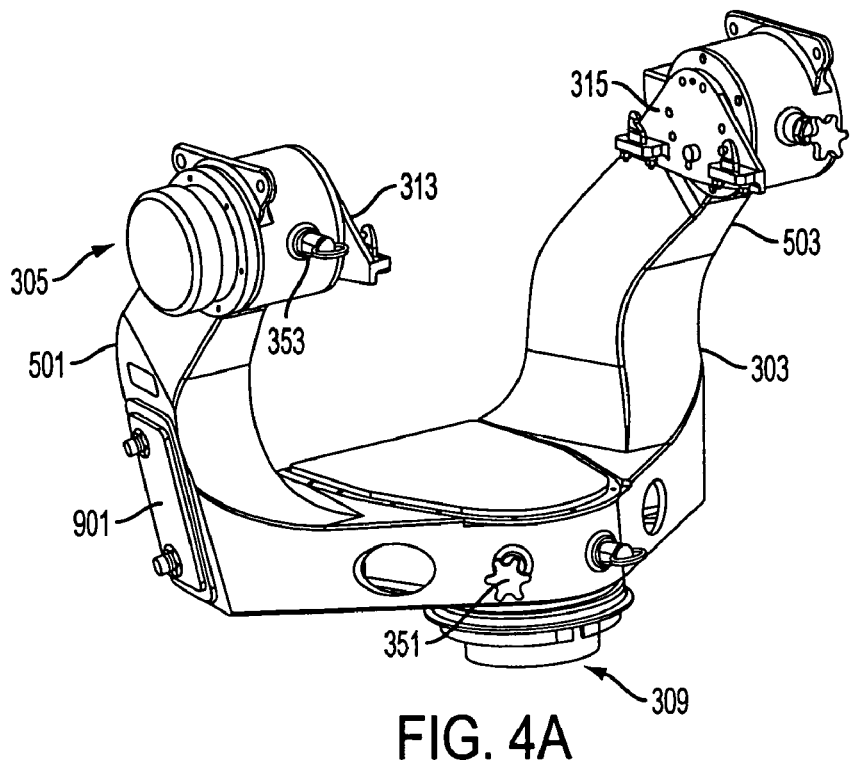
FIG. 4 provides for front (FIG. 4A) and rear (FIG. 4B) perspective views of the sensor mount assembly embodiment of FIG. 3 with the sensor suite removed.
Figure 4B:
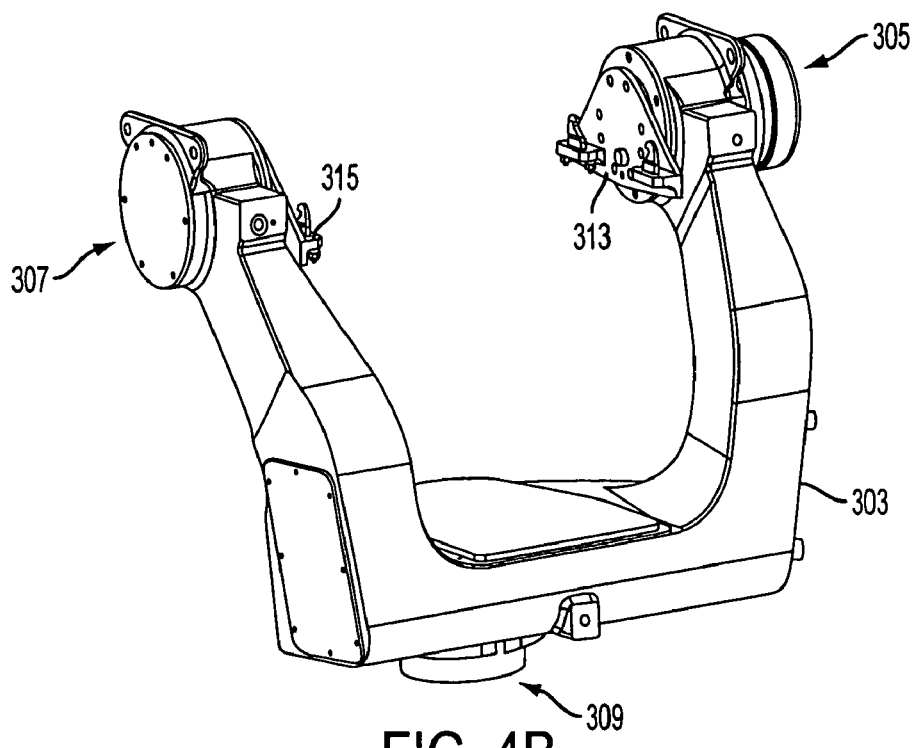
Figure 5:
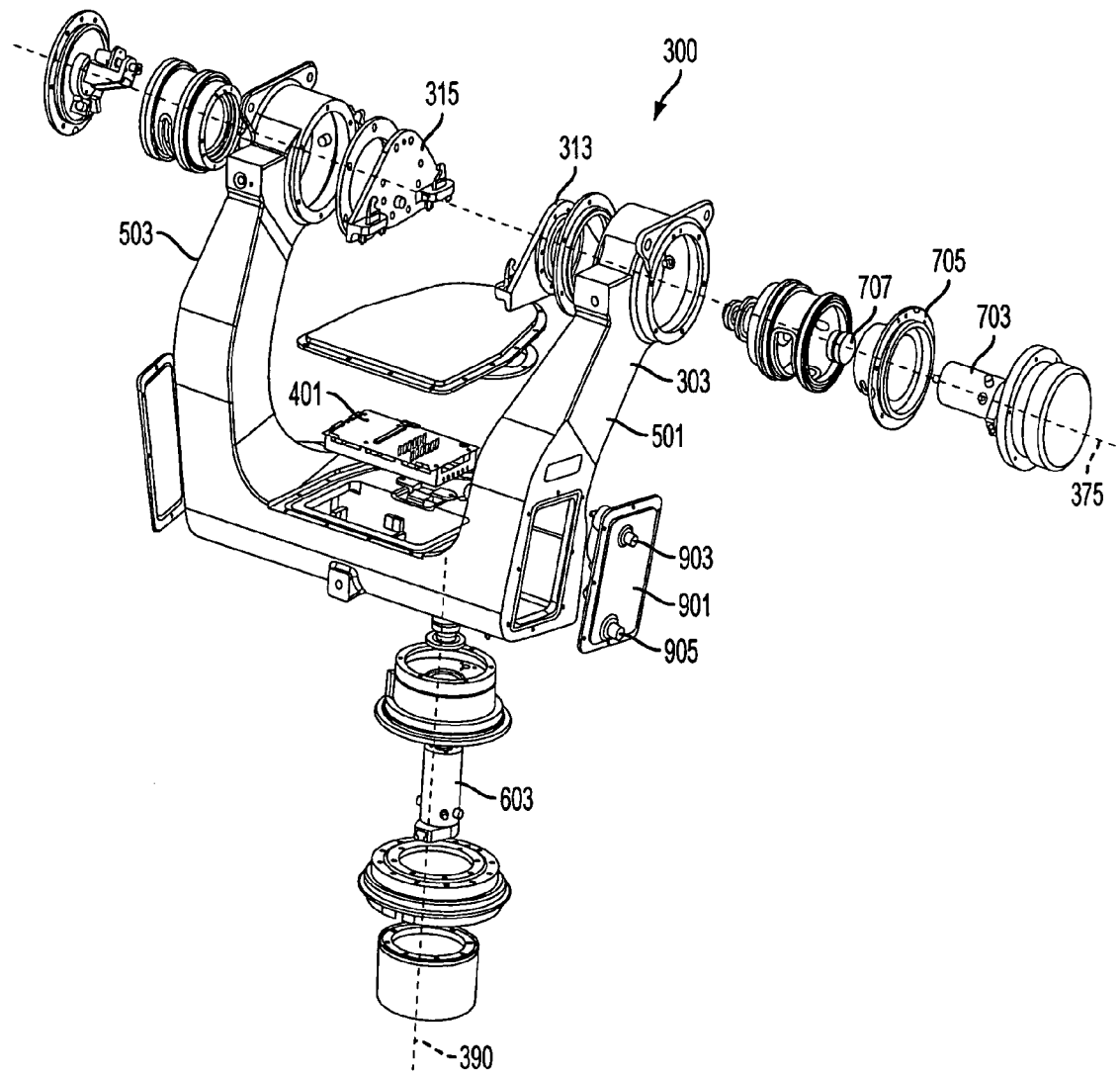
FIG. 5 provides an exploded view of the embodiment of FIG. 4.

FIGS. 4–5 show a "naked" SMA 300, or portions thereof, these figures showing the SMA 300 without the sensor suite 311 being mounted thereon. The SMA 300 generally comprises both a physical support for the sensor suite 311, which, in the depicted embodiment, is a U-shaped yoke 303, and electronics and mechanisms for the implementation of active damping. The SMA 300 allows the sensor suite 311 to move with two degrees of freedom by allowing rotation about the two axes 375 and 390 shown in FIG. 5. In the manner that the SMA 300 is generally mounted on a greater assembly 317 (as in FIG. 1), the axis 375 that is perpendicular to the support arms 501 and 503 of the yoke 303 will generally be parallel to the ground, so that rotation about this axis 375 will provide rotation through an angle of elevation. Thus, the axis 375 is termed the elevation axis 375. In the typical orientation of the SMA 300 (as in FIG. 1), the axis 390 that is generally parallel to the support arms 501 and 503 of the yoke 303 will generally be perpendicular to the ground, so that rotation about this axis 390 will provide rotation through an angle of azimuth. Thus, the axis 390 is termed the azimuth axis 390.

As illustrated in FIG. 4, the SMA 300 utilizes three subassemblies to provide two degrees of freedom to the sensor suite 311. Rotation about the elevation axis 375 is allowed by two elevation subassemblies 305 and 307 to which are connected two sensor mounting brackets 313 and 315. The two sensor mounting brackets 313 and 315 rotate relative to the yoke 303 about the elevation axis 375. Rotation about the azimuth axis 390 is allowed by the azimuth subassembly 309, which provides a point of connection between the yoke 303 and the greater assembly 317 on which the SMA 300 may be mounted (as in FIG. 3). The azimuth subassembly 309 allows the yoke 303, and therefore the attached sensor suite 311 to rotate about the azimuth axis 390 relative to the vehicle or the apparatus upon which the yoke 303 is mounted.

The SMA 300 may include other subassemblies provided for the convenience of a user, the protection of the sensor suite 311, or any other reason. In particular, the yoke 303 may be provided with friction brakes 351 (FIG. 4), which can be used temporarily to increase the resistance to rotation about either axis 375 and 390, or to stop such rotation altogether, holding the sensor suite 311 in a specific elevation relative to the yoke, or in a specific azimuth relative to some point on the vehicle or the greater apparatus 317. The friction brakes 351 can be used to rigidly support the structure when movement is undesirable, such as when the SMA 300 is being transported or when the electrical damping system is not in use. The yoke 303 may also include stow pins 353 to lock the position of the SMA 300 during travel, and to provide positions that may be used as a known reference position when sighting a target.

Each of the elevation and azimuth subassemblies 305, 307, and 309, utilizes a bearing to support the weight of either the sensor suite 311 in the case of the elevation subassemblies 305 and 307, or the yoke in the case of the azimuth subassembly 309, yet also to allow rotation about the relevant axis. Such bearings may be of any appropriate manufacture and construction. Various such bearings are well known to one of ordinary skill in the art.

As well as allowing rotation about two axes 375 and 390, the function of the SMA 300 with an active damping system is to provide a resistance to such rotation about either of the axes 375 and 390 when rotation is initiated by a user. Generally, the active damping system provides damping through a torque generator 201 (FIG. 2, discussed below), which may include an electric motor. To produce damping, the torque generator 201 must provide a torque in the opposite direction to that generated by the user. In the SMA 300 of FIGS. 3–6, damping is provided by a torque generator 201 that is an electric motor. As shown in FIG. 5, in the SMA 300 the electric motors 603 and 703 are aligned respectively along each of the elevation and azimuth axes 375 and 390. In this configuration the electric motors may oppose rotation about each of these axes 375 and 390. In alternate configurations of an SMA 300, more than one torque generating device 201, such as electric motors 603 and 703, may be aligned along an axis of rotation.

Figure 6:
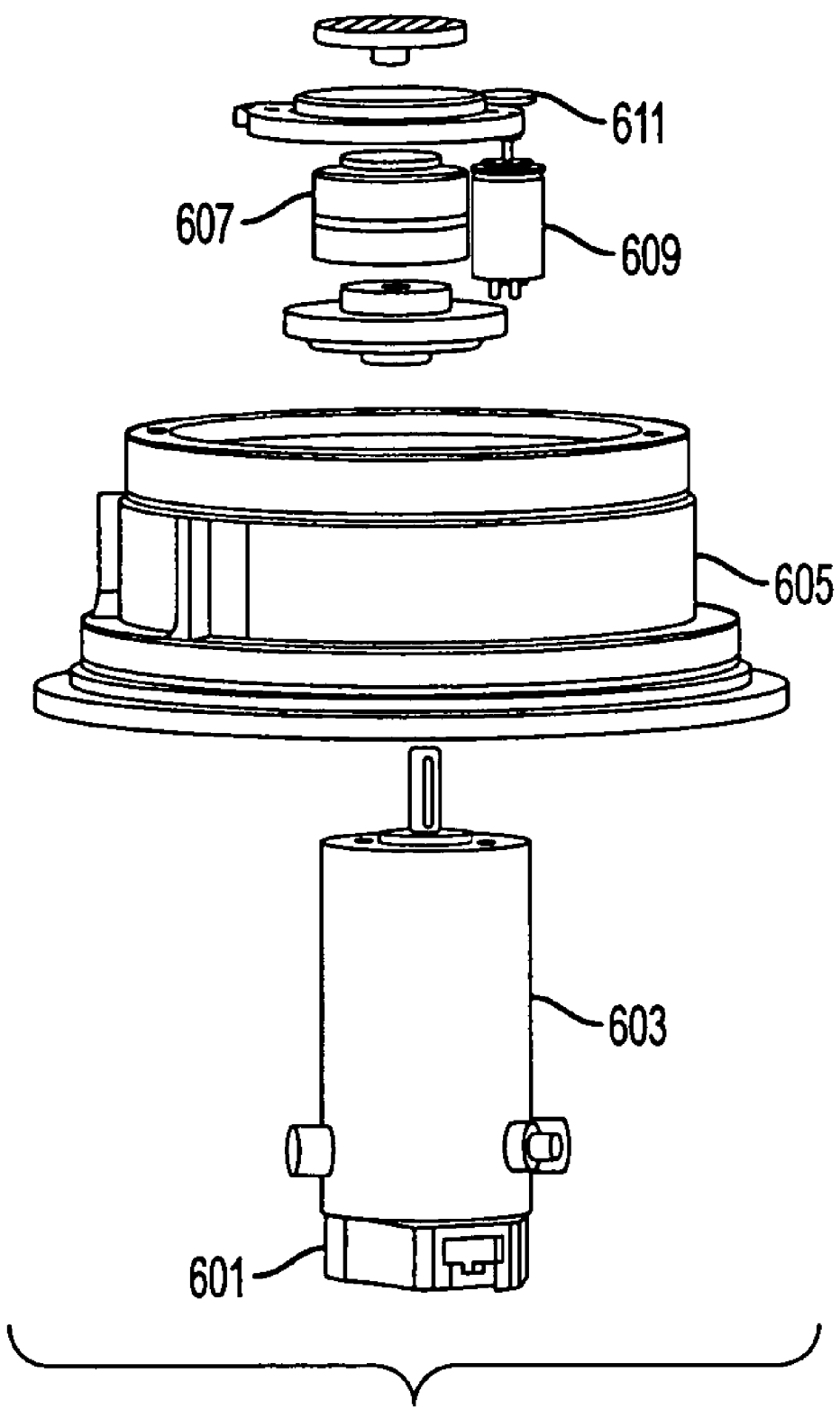
FIG. 6 provides a detailed exploded view of the components of the azimuth subassembly of the embodiment of FIG. 4.

With respect to the specific embodiment that is the SMA 300 shown in FIGS. 3–6, the azimuth subassembly 309 is shown exploded in FIG. 6. The azimuth subassembly 309 generally includes an electric motor 603, which serves as the torque generating device 201. The electric motor 603 is housed inside a support 605 that is mounted to the yoke 303 in such a manner as to allow the support 605 to rotate relative to the yoke 303.

The rotation of the drive shaft of the electric motor 603 is directly monitored by an encoder 601 which may be attached to the rear of the motor 603 as shown, or elsewhere as is known to one of ordinary skill in the art. The encoder 601 serves as the speed measuring device 203 (FIG. 2, discussed below), detecting at least one of how far and how fast the drive shaft of the electric motor 603 is rotating. Data collected by the encoder 601 is generally pseudo-differentiated to provide rate data on the rotation of the electric motor 603, although in an alternative embodiment absolute positioning data may be used with later computation used to provide a rotational rate. The rotational rate data determined from the encoder 601 output is directly related to the speed of movement of the sensor suite 311 about the azimuth axis 390 since movement of the sensor suite 311 is directly translated to the movement of the yoke 303 which is, in turn, translated to movement of the drive shaft of the electric motor 603. The encoder 601 therefore measures the rate of azimuth rotation of the sensor suite 311.

The use of an encoder 601 is particularly desirable for a speed measuring device 203 due to the high accuracy of an encoder 601 over a wide range of speeds, including very low speeds. In an alternative embodiment a tachometer or other rate or position sensing device may be used as the speed measuring device 203, however, tachometers and similar devices often have noisy performance at low speeds. The SMA 300 generally is expected to provide damping throughout the range of rotational rates from 100 milliradians/second to 100 microradians/second, at which rates the noise of a tachometer is likely too great to be practically useful.

Figure 2:
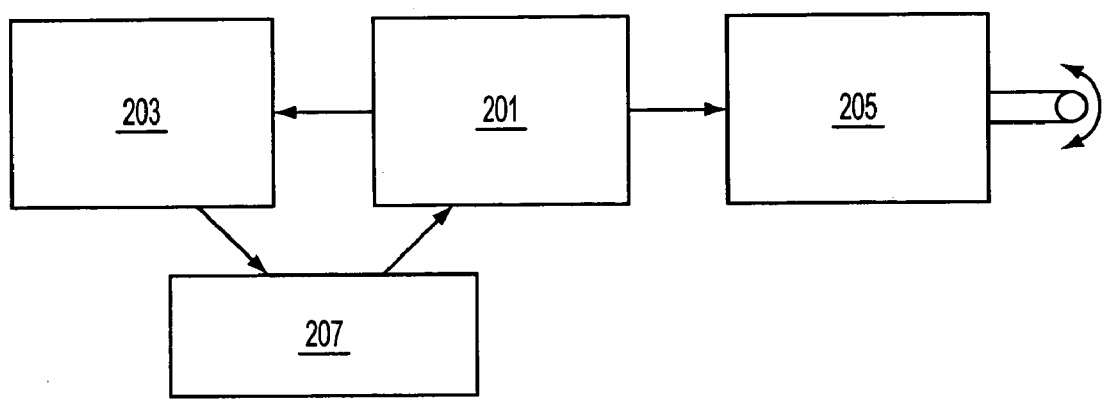
FIG. 2 provides a block diagram of the basic components of an active damping system.

The output from the encoder 601 is input into a control circuit assembly 401 (FIG. 5), an embodiment of which is discussed below with respect to FIG. 7. The control circuit assembly 401 serves as the torque controller 207 (FIG. 2, discussed below). As generally discussed with regard to FIG. 2, the torque controller 207, in this case the control circuit assembly 401, uses rotational rate data from the speed measuring device, 203, in this case the encoder 601, to compute the desired damping torque according to a preset relationship. The preset relationship will generally be one chosen to be between the lines 107 and 109 in FIG. 1 so that the electronically damped system has a feel similar to that of prior art fluid damped systems. However, this is by no means required. For any given application, it may be determined that an optimal arrangement places the damping torque curve 101 outside the area shown in FIG. 1, or in fact creates a completely different shape of damping torque curve. Further, specialty curves may be used for unique situations. For instance, if targeting particularly fast targets, a completely different curve may be used. Further, a curve may be selected to represent the type of feel a preferred movement would have if part of the system failed. This kind of curve could be used for training purposes or to represent extreme situations. Once computed according to the selected damping torque curve 101, a signal directly related to the desired damping torque is then sent from the control circuit assembly 401 to the electric motor 603 as a voltage input to the electric motor 603, which then produces the desired damping torque.

Continuing with a description of FIG. 6, the damping torque of the electric motor 603 is generally directed to the SMA 300 through gearing 607, preferably including a harmonic gear. The gearing provides multiple benefits, including increasing the torque produced by the electric motor 603, and reducing rebound due to the damping torque when the force provided by the user is reduced. Harmonic gears and their use in providing relatively backlash-free operation of torque generators are well known to those of ordinary skill in the art. The increase in torque provided by the gearing 607 will generally be accounted for in the calculation of the command signal sent to the electric motor 603 by the control circuit assembly 401.

As an additional aid in reducing backlash, it is generally desirable that the feedback loop among the electric motor 603, the encoder 601, and the control circuit assembly 401 have a short response time. In this way, when the user suddenly ceases movement of the sensor suite 311, there is a very short time before the electric motor 603 is directed by the control circuit assembly 401 to reduce the damping torque. The benefit from the rapid response by the feedback loop is that when the user reduces or ceases applying a force to the sensor suite 311, the sensor suite 311 is not suddenly jerked in a direction opposite to the direction the user was moving it.

There is also included within the azimuth subassembly of the depicted embodiment, a resolver 609, which is used to detect absolute changes in the location of the SMA 300 about the azimuth axis relative to a given reference point. Generally, information provided by the resolver 609 on the position of the SMA 300 will also provide information on the position and movement of the sensor suite 311, since as discussed above, the movement of the yoke 303 about the azimuth axis 390 is directly proportional to the movement of the sensor suite 311 about the azimuth axis 390. The resolver 609 may directly measure the location of the yoke 303, as in the depicted embodiment; or, where the resolver 609 is otherwise located with respect to the sensor suite, it may directly measure the location of the sensor suite 311. As is depicted, instrumentation gearing 611 may be further included to improve the sensitivity of the resolver 609, enabling the resolver 609 to recognize even very small movements of the yoke 303 or sensor suite 311 about the azimuth axis. Generally, the resolver 609 provides indications of the location of the sensor suite 311 relative to the vehicle upon which it is mounted to the MPU which uses this data for target location and communication of this data to locations remote from the COLT vehicle.

In an embodiment, the resolver 609 may operate as part of a continuous built-in test (CBIT) function. In particular, motion should be detected by both the encoder 601 and the resolver 609 simultaneously when the sensor suite 311 or yoke 303 is moved about the azimuth axis 390. The arc of motion, the rate, or the position of the sensor suite 311, as determined according to data from each of the encoder 601 and the resolver 609 may therefore be directly compared. The CBIT function operates based on the principle that if data for each of the encoder 601 and the resolver 609 do not correlate properly, a fault condition is detected, providing an indication that the SMA 300 may not be working properly and may be in need of service.

FIG. 5 provides the reference for the following discussion of an exploded view of the elevational subassemblies 305 and 307. For damping the rotation about the elevation axis 375, similar components are used within the subassemblies 305 and 307 as are used in the azimuth rotational subassembly 309. Because there are two subassemblies 305 and 307, one on each of the support arms 501 and 503 of the yoke 303, however, the components are not all assembled identically to the components of subassembly 309.

It is presumed that the sensor suite 311 is of generally rigid construction and is rotationally mounted on both sides through the common elevational axis 375. Therefore, any rotational change to one side of the sensor suite 311, will also result in a change to the other side. While the discussion below describes the preferred placement of the various components, such placement is by no means required.

The left side elevation subassembly 305 includes the electric motor 703, the encoder 701, and the motor support 705. The drive shaft of the electric motor 703 is connected to the left side sensor mounting bracket 313 via gearing 707, preferably including a harmonic gear. The left side sensor mounting bracket 313 will generally be able to rotate about the elevation axis 375 relative to the yoke. Generally, then, the drive shaft of the electric motor 703 does not attach to the yoke 303 as does the drive shaft of the electric motor 603 within the azimuth subassembly 309. A harmonic gear 707 will provide generally backlash free gearing from the electric motor 703 to the sensor suite 311 via the left side sensor mounting bracket 313. The above discussion of the operation of the azimuth electric motor 603 and encoder 601 is relevant to the correlated components used here, elevation electric motor 703 and encoder 701, which when connected to the control circuit assembly 401 create the feedback loop of a second active damping system within the SMA 300.

The right side elevational subassembly 307 includes the resolver 709 which is connected to the right side sensor mount 315. The resolver 709 will detect the movement of the sensor suite 311 relative to the yoke 303. Since the separate subassemblies 305 and 307 are connected by the rigid sensor suite 311, rotation about the elevation axis should produce similar results in both subassemblies 305 and 307, so that as discussed above cross checking between the resolver 709 and the encoder 701 (as by CBIT) may be performed to detect SMA malfunction. Generally, resolver 709 operates consistently with the operation of resolver 609 discussed above.

Also shown in FIG. 5 are mounting locations for the control circuit assembly 401 (discussed below with respect to FIG. 7) and power filter assembly 901. The power filter assembly 901 ensures the desired power flow to the damping system. In the depicted embodiment there is a connector 905 that may be used for connection to a terminal for use in diagnostic analysis. Additionally, the power filter assembly 901 comprises a connector 903 to attach to a power source. In the preferred embodiment, the power is obtained from the COLT vehicle to which the SMA 300 is attached. The power can then be directed through a filter, such as an electromagnetic interference (EMI) filter and a circuit breaker or fuse (each of which may be mounted on the power filter assembly 901) before being provided to the control circuit assembly 401. While such a power filter assembly 901 is not necessary in all embodiments, it can be used to protect the control circuit assembly 401 from improper operation and damage resulting from an undesirable power flow. Neither the power filter assembly 901 nor the control circuit assembly 401 need to be mounted on the SMA 300, and either or both may be remotely connected to the SMA 300 in another embodiment. The positions provided in the depicted embodiment, however, allow for the system to be relatively self contained to improve ease of manufacture, transport and use. Each of the power filter assembly 901 and the control circuit assembly 401 may be placed in a reinforced containment structure and components may be hardened as necessary for military use.

Stepping back from the detailed illustrations and description of FIGS. 3–6, FIG. 2 shows in a general block diagram of an embodiment of an active damping system that may be utilized for various applications in which rotational damping is appropriate. The active damping system generally provides for a feedback loop that includes a torque controller 207, a torque generating device 201, and a speed measuring device 203. As mentioned above, in an embodiment such as that depicted in FIGS. 3–6, the torque controller 207 is a microprocessor, the torque generating device 201 is an electric motor, and the speed measuring device 203 is an encoder. More generally, the torque controller 207 is any device that can adjust the damping torque generated by the torque generating device, including various electronic processors and various mechanical linkages that adjust the output of the torque generating device; the torque generating device 201 is any device that is a source of kinetic energy that can be converted to a torque including by use of a spring, an internal combustion engine, or through another source of power; and the speed measuring device 203 is any device that can measure a rate of change of a parameter affected by the rotation of an object, the motion of which is to be damped, such as the sensor suite of the embodiment in FIGS. 3–6, whether the rate of change is in angular or linear position or some other change directly related to the object's rotation.

The active damping system generally operates as follows. The torque controller 207 is provided data from the speed measuring device 203 regarding at least one of the position and rate of rotation of a portion of the torque generating device 201. The torque controller 207 uses this data to compute a signal to send to the torque generating device 201, which signal operates to adjust the damping torque provided by the torque generating device 201. In an embodiment, the torque controller 207 is an electronic microprocessor capable of computing a desired damping torque based on preprogrammed data and real-time acquired data (e.g., from the speed measuring device 203), and the torque generating device 201 is an electric motor.

As shown in FIG. 2, a gearbox 205 may be included as an element of the active damping system. The gearbox 205 may operate to multiply the torque produced by the torque generating device 201, which may allow the use of a less powerful and physically smaller torque generating device 201, and may increase the accuracy of the speed measuring device 203, improving sensitivity. A less powerful torque generating device 201, in turn, may cause reflected inertia from the torque generating device 201 to be small relative to the inertia of the sensor suite.

In an alternate embodiment, rather than providing position or rate of rotation data for the torque generating device 201, the speed measuring device 203 provides data related to the position or rate of rotation of an object, the rotation of which is to be damped. In the embodiment depicted in FIG. 2 it is presumed that the torque generating device 201 is connected to such a rotating object in such a way that the torque generating device 201 or a portion thereof rotates in concert with the rotating object, the motion of which is to be damped. In a further alternate embodiment, the torque controller 207 does no computation based on data supplied by the speed measuring device 203, but uses such data in another way, e.g., in a mechanical manipulation, to send a control signal to the torque generating device 201.

An active damping system such as is shown in FIG. 2 may be used in combination with a traversing unit (TU) such as the SMA (300) of FIG. 4 by connecting the torque generating device 201 to a portion of the TU through which connection the active damping system can apply a resistive torque. In essence, the active damping system can replace the fluid damping system of the prior art TU. When the active damping system acts in combination with a TU, the torque generating device 201 provides a torque to the TU that tends to resist the force applied to the TU by a user thereof. Active damping can be achieved where, due to the connection between the active damping system and the TU, as a user applies a rotational force to the TU, the force tends to cause rotation of at least a portion of the TU, and also causes rotation of the torque generating device 201 connected thereto. The rotation of the torque generating device 201 (as a result of the user applied force) is measured by the speed measuring device 203 and output to the torque controller 207. The torque controller 207 then computes the appropriate resistive torque to be applied by the torque generating device 201 and sends an appropriate command thereto causing the torque generating device 201 to generate the appropriate resistive torque. Because the speed measuring device 203 is making real-time measurements and supplying them to the torque controller 207, which updates the commands to the torque generating device 201 in real-time, the damping system is able to provide a particular torque "on demand," i.e., as the force applied by the user of the TU changes, the demand for resistive torque changes, and the active damping system can supply the necessary torque to meet the particular demand.

Note that where rate data is provided by the speed measuring device 203, such data may be directly detected by the speed measuring device 203, or may be mathematically computed from absolute position data measured thereby, such as may be done by any of various devices known to those of ordinary skill in the art. Note, too, that where computations are made by the torque controller 207, such computations may be based solely on the output of the speed measuring device 203, or may include other factors as discussed below. Particularly where the torque generating device 201 is an electric motor, the command from the torque controller 207 may be a voltage which needs to be amplified by an amplification device (not shown) to generate an appropriate input to the torque generating device 201.

Where the torque controller of the damping system of FIG. 2 includes an electronic processor, such an electronic processor may allow empirical optimization of the damping function, as well as an option allowing the operator to select one of several preprogrammed relationships for computing the desired torque command, depending on, for instance, the task at hand or the preference of the user. In particular, the processor may use any damping torque curve 101 with which it has been programmed (either in software or hardware) for computation of the torque command, and may take into account any variable provided to it in addition to (or even instead of) the rotational rate provided by the speed measuring device 203. For instance, even though the active damping system is generally inherently less sensitive to temperature variations than are the prior art fluid damping devices, a temperature sensor may be included in the system to allow inclusion of temperature data among the variables influencing selection of various damping force curves. In a further embodiment, an adaptive mode may be provided in which the selection of a damping torque curve 101 is influenced by the rotational rates recently detected by the speed measuring device 203. Such an adaptive mode may, for instance, allow greater sensitivity when tracking a constant velocity target for an extended time.

Further, one of ordinary skill in the art will recognize that in an electronically controlled system, the damping torque curve 101 governing the damping force may be set to any shape, and that changes in the damping torque curve 101 may be performed at any time in response to any variable. Therefore, in an embodiment of the present invention, any damping torque curve 101 may be selected and programmed into the damping system's torque controller 207. Still further, in an active damping device as is shown in FIG. 2, because of the active control provided by the torque controller 207, an effect that mimics the slip clutch of the prior art fluid damped systems may be achieved through specific shaping of the damping torque curve 101 utilized by the torque controller 207 to set the desired resistive torque. This slip clutch effect may, but need not mimic identically the effect of the slip clutch of the prior art. For instance, the "slip clutch" portion 117 of the damping torque curve 101 need not be level (as it is in prior art slip clutch systems), but may simply provide a different relationship than that provided in the "working" portion 115 of the damping torque curve 101, the "working" portion 115 being that portion of the damping torque curve 101 utilized to compute the torque command while the TU is being used as an aid to track a target (as compared to when the TU is being rotated relatively rapidly to find a new target). An electronically controlled slip clutch effect as just described is significantly more stable and repeatable than its fluid damping counterpart.

Figure 7:
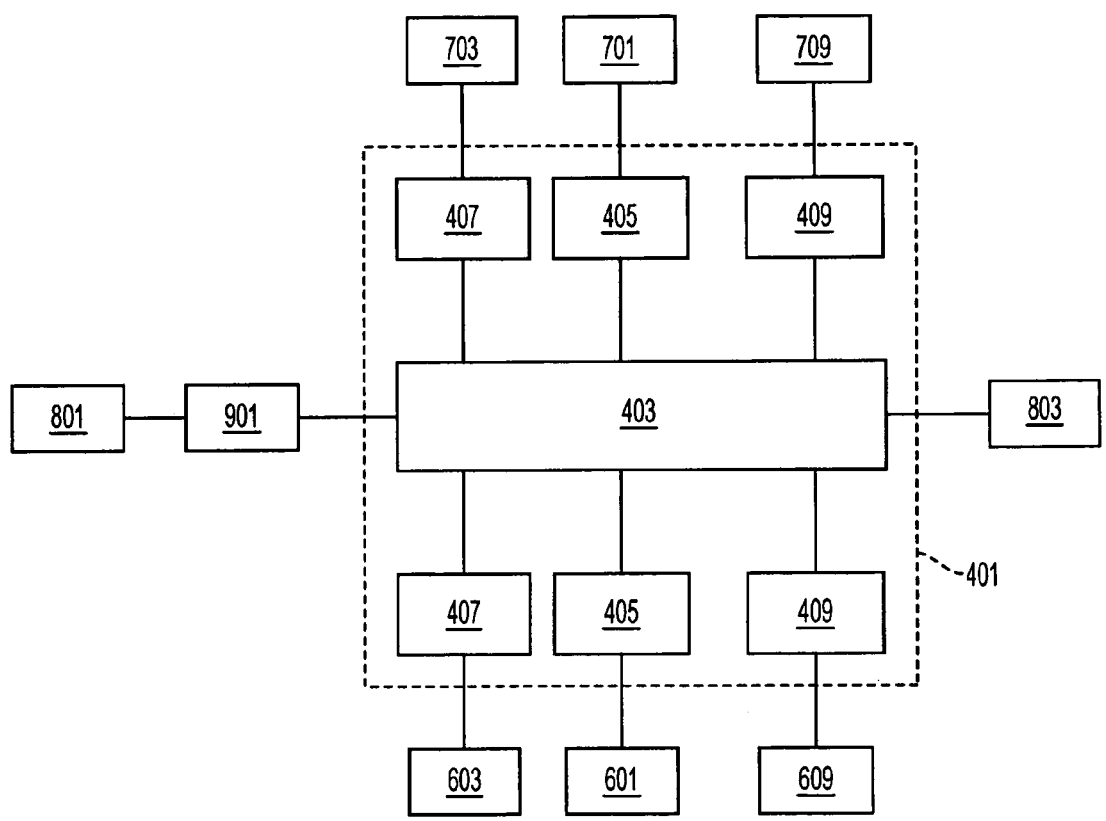
FIG. 7 provides for a block diagram of an embodiment of an electronically programmable active damping system such as is compatible with the SMA of FIG. 4.

FIG. 7 depicts a block diagram of an embodiment of an electronically controlled active damping system such as may be used in conjunction with the SMA 300. In this embodiment, the control circuit assembly 401 serves as the torque controller 207 of the general damping system shown in FIG. 2. In an embodiment, the control circuit assembly 401 may be hardwired solely for the particular function of controlling the damping system, or alternatively, may be wired to allow communications to and from an external source, including being wired to receive control commands therefrom. The control circuit assembly 401 obtains power from a power source 801. The power source 801 will generally be an external source as shown in FIG. 7, such as a power source derived from a vehicle on which the SMA is mounted, or may, in an alternative embodiment, be an onboard source, such as a battery on the SMA. The power may be passed through a filter assembly 901 to provide for "clean" power, e.g., power without voltage or current fluctuation. Such a filter assembly 901 may be comprised of multiple components, including an electromagnetic interference filter and a circuit breaker.

In the damping system embodiment shown in FIG. 7, the control circuit assembly 401 gets data input from the two encoders 601 and 701, which are reading at least one of positional and rotational rate information of the electric motors 603 and 703 that may be aligned along the axes 375 and 390 (FIG. 5). The input from the encoders 601 and 701 generally provides the rotational rate information of the movement of the sensor suite 311 in two dimensions, which information may be passed through a quadrature decoder 405 to produce the appropriate input to the microprocessor 403. An electronic microprocessor 403 will process this information, and any other information provided to it that is relevant to the operation of the damping system, to determine the desired damping torque. In an embodiment for military applications as shown in FIG. 2, the microprocessor 403 preferably comprises an 87C51 microcontroller with 32 Kbytes of internal EPROM, a serial EEPROM with integral watchdog function, and 32 Kbytes of external static RAM. As discussed with respect to the general schematic of a damping system in FIG. 2, the control circuit assembly 401 will output a command to the two electric motors 603 and 703 to produce the desired damping torque about each rotational axis. In the embodiment of FIG. 7, the torque command will generally be a voltage signal that needs amplification by a servo amp 407 to produce an appropriate signal for either of the electric motors 603 and 703.

Various other inputs and outputs may be processed by the microprocessor 403. For instance, a port linking to an MPU 803 or similar device may also be provided to allow the microprocessor 403 to send and receive relevant information to and from an external processor. Information that may be usefully supplied to the MPU 803, such as for targeting purposes in military applications, includes very accurate positional data for the sensor suite 311, such as may be provided by resolvers 609 and 709. Such positional data may be supplied to the microprocessor 403 for the purpose of performing error testing through comparison to information provided by the encoders 601 and 701. In such an embodiment the resolver data may be passed through analog to digital converters 409 to produce the appropriate input to the microprocessor 403. In an alternate embodiment of the SMA 300, data from a resolver 609 and 709 may be sent in a path that bypasses the control circuit assembly 401, and is sent directly to the MPU 803. There may also be inputs to the microprocessor 403 that provide data relevant to the computation of damping torque or selection of a damping torque curve 101, such as the input from a temperature sensor (not shown). An optional microprocessor port, such as discussed for linking to the MPU, allows the microprocessor 403 to be connected to a user interface for purposes of diagnostic analysis.

In an embodiment, there are two functional modes for the microprocessor 403, operational and diagnostic. In the operational mode, the microprocessor 403 will act as a member of the feedback loop (discussed generally with respect to FIG. 2) to provide control over the active damping system. Additionally, the microprocessor 403 will perform power-up, continuous built-in test (CBIT) functions, and report angle data from the resolvers 609 and 709 to the MPU 803. The microprocessor 403 may allow a boresighting calibration to be performed, which gimbal angle data for the SMA 300 can be stored in the microprocessor 403 or a connected device. The diagnostic mode will generally allow for analysis and correction of the operation of the damping system. To enter the diagnostic mode, an operator may need an input key sequence from a testing device into a diagnostic link. This is preferably the only way to enter diagnostic mode. Where diagnostic mode is only available through the input of a key sequence, a default to operational mode may occur if the operator does not input the proper key sequence over the diagnostic link within a specified time.

While the invention has been discussed herein as principally used for actively damped movement of sensor suites for use in military operations, one of ordinary skill in the art would understand that the SMA 300 could be used to provide resisted movement to other devices. Sensor units can be used in many situations outside of military targeting, for instance, in industrial automation, theatrical lighting, or in astronomy. Further, there are often times where other devices need to be moved smoothly against resistance to prevent "jitter." For instance, movie and television cameras can make use of an SMA 300 to improve smooth scanning for making movies or television shows. It would be apparent to one of ordinary skill in the art how the SMA 300 with the electronic damping system, and the methods of use discussed herein, may be adapted to alternative embodiments of the invention, which may include a yoke 303 of a very different shape (possibly with only one of the support arms 501 and 503), or otherwise configured for some advantage in a particular alternate application, such as those just mentioned.

While the invention has been disclosed in conjunction with a description of certain preferred embodiments, this detailed description is intended to be illustrative and should not be understood to limit the scope of the present disclosure. As would be understood by one of ordinary skill in the art, embodiments other than those described herein in detail are encompassed by the present invention. Modifications and variations of the described embodiments may be made without departing from the spirit and scope of the invention, which is defined by the appended claims.

The invention claimed is:

1. An assembly for mounting an object comprising:
   at least one support arm;
   at least one connector through which said object is rotationally attached to said support arm such that rotation of said object may occur about a first axis of rotation;
   a base rotatably connected to said support arm such that rotation of said support arm relative to said base occurs about a second axis of rotation; and
   at least one active damping system for damping the rotation of an object to an extent dependent upon the angular velocity of the object, said active damping system comprising:
      a torque controller;
      a speed measuring device connected to said torque controller so as to allow speed measurement data created by said speed measuring device in connection with a speed measurement correlated to rotation of said object to be transferred to said torque controller; and
      a torque generating device connected to said torque controller so as to allow said torque controller to transmit damping torque data to said torque generating device to control a damping torque generated by said torque generating device;
      wherein said damping torque acts in a decelerating manner on the rotation of said object;
   wherein said at least one active damping system includes a first active damping system capable of conveying a damping torque that acts to oppose rotation of said object about said first axis of rotation.

2. An assembly for mounting an object of claim 1 wherein said object is one of a sensor suite, a camera, a light, and a telescope.

3. An assembly for mounting an object of claim 1 wherein said at least one active damping system includes a second active damping system capable of conveying a damping torque that acts to oppose rotation of said object about said second axis of rotation.

4. An assembly for mounting an object of claim 3 wherein said first and second axes of rotation are perpendicular.

5. An assembly for mounting an object of claim 3, wherein for both of said active damping system and said second active damping system:
   said torque generating device comprises an electric motor;
   said speed measuring device comprises an encoder; and
   said torque controller comprises a microprocessor.

6. An assembly for mounting an object of claim 5, further comprising:
   at least one resolver connected to said object so as to enable said resolver to operate as a sensor of the rotational position of said object; and
   wherein said at least one resolver includes a first resolver capable of sensing the rotational position of said object relative to said first axis, and a second resolver capable of sensing the rotational position of said object relative to said second axis.

* * * * *